`US011022078B1`

(12) United States Patent
Schechter et al.

(10) Patent No.: US 11,022,078 B1
(45) Date of Patent: Jun. 1, 2021

(54) METHODS FOR OPERATING AND CONTROLLING AN INTERNAL COMBUSTION ENGINE THAT EXHAUSTS NO GAS INTO OUTSIDE ATMOSPHERE

(71) Applicants: Michael Moses Schechter, Deerfield Beach, FL (US); Victor Avi Schechter, Plano, TX (US)

(72) Inventors: Michael Moses Schechter, Deerfield Beach, FL (US); Victor Avi Schechter, Plano, TX (US)

(*) Notice: Subject to any disclaimer, the term of this patent is extended or adjusted under 35 U.S.C. 154(b) by 0 days.

(21) Appl. No.: 16/974,323

(22) Filed: Dec. 29, 2020

(51) Int. Cl.
| | |
|---|---|
| *F02M 25/06* | (2016.01) |
| *F02M 25/025* | (2006.01) |
| *F01L 1/34* | (2006.01) |
| *F02B 47/10* | (2006.01) |
| *F02M 26/23* | (2016.01) |
| *F02M 26/35* | (2016.01) |
| *F02M 25/03* | (2006.01) |
| *F02M 25/12* | (2006.01) |
| *F02M 26/00* | (2016.01) |

(52) U.S. Cl.
CPC .............. *F02M 26/23* (2016.02); *F01L 1/34* (2013.01); *F02B 47/10* (2013.01); *F02M 25/03* (2013.01); *F02M 25/12* (2013.01); *F02M 26/35* (2016.02); *F02M 2026/001* (2016.02)

(58) Field of Classification Search
CPC ........ F02M 26/23; F02M 26/35; F02M 25/03; F02M 25/12; F02M 2026/001; F02M 25/06; F01L 1/34; F02B 47/10; F02B 47/02; F02B 47/00; F02B 47/04; F02B 47/06; F02B 47/08
See application file for complete search history.

(56) References Cited

U.S. PATENT DOCUMENTS

| | | |
|---|---|---|
| 7,954,478 B1 | 6/2011 | Schechter |
| 7,958,872 B1 | 6/2011 | Schechter |
| 8,046,984 B1 | 11/2011 | Schechter |
| 8,151,553 B1 * | 4/2012 | Schechter .............. F02M 25/10 60/279 |
| 9,528,192 B1 | 12/2016 | Chen |

* cited by examiner

*Primary Examiner* — Jacob M Amick

(57) ABSTRACT

An internal combustion engine inducts no air from outside atmosphere and it discharges no gas into outside environment. The engine receives hydrocarbon fuel and oxygen, and its combustion gas consists mostly of carbon dioxide and water vapor. Carbon dioxide is captured, stored and subsequently sequestered by using it with water to create a hydrocarbon fuel that can be supplied back to the engine. In that way, the engine fuel is repeatedly regenerated and reused, and the engine operates in a carbon neutral mode of operation. Some of the combustion gas is used as a diluent gas in the engine. High specific heat and high density of that gas permit operation in high-efficiency overexpanded cycle without an increase in the engine size. Various methods of the engine control and operation are described, including methods to reduce pumping loss. Various modes of in-cylinder diluent gas formation are considered.

20 Claims, 12 Drawing Sheets

METHODS FOR OPERATING AND CONTROLLING AN INTERNAL COMBUSTION ENGINE THAT EXHAUSTS NO GAS INTO OUTSIDE ATMOSPHERE

FIELD OF THE INVENTION

The present invention relates to methods of operation of internal combustion engines that don't induct air from outside atmosphere and discharge no gas into the atmosphere.

BACKGROUND OF THE INVENTION

The airless engine of the present invention inducts no air from outside atmosphere and discharges no gas into the atmosphere, thus contributing to better air quality and reduced global warming. That engine also has some unique properties that can be exploited to design and operate the engine using methods that permit the airless engine to achieve a much higher efficiency than in a conventional air-inducting engine. These methods include:

1. Increasing the expansion ratio.
2. Elimination of throttling.
3. Recovery of lost heat.
4. Reducing friction.

The present invention also includes the method of minimizing the volume of gas storage and the method of sequestering the carbon dioxide, produced in combustion, by converting it into fuel to power the engine.

These methods are the subject of the present invention.

PRIOR ART

A U.S. Pat. No. 8,151,553 to Schechter describes an internal combustion engine that inducts no air from outside atmosphere and exhausts no gas into the atmosphere. It receives fuel and oxygen, performs a combustion cycle and most of its combustion gas is recycled back into the engine, where it serves as a diluent gas. It is an airless engine.

Thanks to higher density and higher specific heat of the diluent gas, an airless engine requires a smaller volume of diluent gas than an air-inducting engine of equal power. The method used in the system described in the above patent uses the above properties of the diluent gas to reduce the size of the engine. A smaller engine has less friction, which improves its efficiency.

In the airless engine of the present invention, an increase in the engine efficiency is achieved in a different way: The timing of the engine intake valves closing is such that the volume of gas trapped in the cylinder at the beginning of compression is only a fraction of the cylinder volume. The clearance volume is reduced too, so that a proper value of compression ratio is retained. Reduction in clearance volume leads to an increase in expansion ratio, which is achieved without an increase in cylinder volume. The increase in expansion ratio improves the efficiency of the thermodynamic cycle.

An increase in expansion ratio can also be accomplished in a conventional air-inducting engine. Such a cycle is often called overexpanding cycle, or Atkinson cycle. However, in case of the conventional engine, an increase in expansion requires an increase in the cylinder volume, which leads to an increase in friction. Thanks to higher density and higher specific heat of the gas, an increase in expansion, in the airless engine, is achieved without increasing the cylinder volume.

An internal combustion engine operates under load most of the time. In such operation, a loss to friction is a small fraction of the work performed, while a substantial increase in expansion rate can do even more for improvement in efficiency than a reduction in engine size. Therefore the method of the present invention offers a greater improvement in engine efficiency in most cases.

The above patent describes using a controllably variable restriction to the flow of excess gas in order to control the pressure of recycled combustion gas. Using a restriction to gas flow involves a pumping loss leading to reduction in efficiency.

In the system of the present invention, restriction to the flow of gas is avoided. Instead, the excess gas flows into a constant-displacement compressor that operates with a speed proportional to the speed of the engine. Since the compressor displacement is fixed, and the compressor inlet gas temperature is approximately constant, any change in the mass of compressor inlet flow per cycle must be associated with a proportional change in its pressure, which is equal to the pressure of the engine diluent gas. Therefore the mass of the diluent gas in the engine automatically varies in proportion to changes in the fuel flow. The system is inherently self-regulating, and the mass of the diluent gas automatically changes in proportion to the changes in the mass flow of the fuel received into the engine. The gas-to-fuel ratio remains constant, and there is no need for throttling to control the flow of the inducted diluent gas. This reduces the pumping loss and contributes to better fuel efficiency.

The above patent describes application of an outside heat exchanger using the heat of the recycled gas to boil water and adding the resulting steam to the cylinder chamber during gas expansion, thus using the heat of the hot recycled gas to increase efficiency. An outside heat exchanger is a relatively inefficient device: only some of the gas heat is transferred to the water. Some heat, inevitably, escapes to the outside environment, and only a fraction of the heat escaping with the exhaust gas is recovered.

In contrast to the above, in the system of the present invention, the engine can induct hot exhaust gas. Water is injected directly into the cylinder, forming steam there that performs useful work, thus improving the efficiency of the engine. Without the outside heat exchanger, the recovery of the exhaust gas energy is more complete, which results in greater improvement in efficiency then in the system of the above patent. Elimination of the heat exchanger is also a reduction in costs.

The system of the present invention anticipates hot gas induction in both four-stroke and two-stroke cycles. Operation in two-stroke cycle, with hot gas induction, reduces the size of the engine, which reduces the friction and improves the engine efficiency. The above patent does not anticipate such operation.

The system of the above patent anticipates adding water to the cylinder chamber, during gas compression, to reduce the work of compression and improve efficiency. The system of the present invention also anticipates adding water to the engine to reduce the work of compression and improve the efficiency.

The system of the present invention anticipates the method of minimizing the required volume of gas storage, which can be accomplished by sequentially storing the oxygen and the carbon dioxide in the same container. The above patent does not anticipate such method of operation.

The system of the present invention anticipates converting carbon dioxide, produced in engine combustion, into fuel that is used to power the engine. The above patent does not anticipate such operation.

A U.S. Pat. No. 7,954,478 to Schechter describes an internal combustion engine using some of its exhaust gas mixed with oxygen instead of air. Nitrogen oxide emission is eliminated, but carbon dioxide created in combustion is discharged into environment.

A U.S. Pat. No. 7,958,872 to Schechter describes an internal combustion engine that is similar to the engine of the above U.S. Pat. No. 7,954,478, but it also includes collecting water produced in combustion and injecting it back into the engine. Water evaporation in the engine improves fuel economy. Carbon dioxide created in combustion is discharged into environment.

A U.S. Pat. No. 8,046,984 to Schechter describes a gas turbine engine using some of its exhaust gas mixed with oxygen instead of air. Nitrogen oxide emission is eliminated, but carbon dioxide created in combustion is discharged into environment.

OBJECTS AND ADVANTAGES

One object of the present invention is to improve the efficiency of the thermodynamic cycle in the airless engine of the present invention relative to thermodynamic efficiency of a conventional air-inducting engine of equal power. This is accomplished by increasing the expansion of gas in the cylinder of the airless engine, without increasing the gas compression and without an increase in the cylinder volume. The timing of the intake valves is such that the gas contained in the cylinder chamber at the beginning of gas compression occupies only a fraction of the full cylinder volume, and the gas compression takes up only a fraction of the piston stroke, while the gas expansion takes up the entire piston stroke. The clearance volume is reduced too, so that a desirable value of compression ratio is retained. Reduction in the clearance volume increases the expansion ratio, which remains substantially greater than the compression ratio, thus improving the engine efficiency. An increase in efficiency is achieved without increase in cylinder volume.

Another object of the present invention is to improve the efficiency of the airless engine by eliminating the need to use throttling to control the flow of the inducted gas. This is accomplished by the excess gas flowing into a constant displacement compressor that operates with a speed proportional to the speed of the engine. Since the compressor displacement is fixed, and the compressor inlet gas temperature is approximately constant, any change in the mass of compressor inlet flow per cycle must be associated with a proportional change in its pressure, which is equal to the pressure of the engine diluent gas. Therefore the mass of the diluent gas in the engine automatically varies in proportion to changes in the fuel flow. The system is inherently self-regulating, and the mass of the diluent gas automatically changes in proportion to the changes in the mass flow of the fuel received into the engine. The gas-to-fuel ratio remains constant, and there is no need for throttling to control the flow of the inducted (or retained) diluent gas. This reduces the pumping loss and contributes to better fuel efficiency.

Still another object of the present invention is to improve the efficiency of the airless engine by eliminating outside cooling of the recirculated gas and injecting water for in-cylinder cooling. Bringing back hot gas brings back to the cylinder some of the heat that escaped from the cylinder previously. That heat adds to the heat of combustion and compensates for some of the heat that escaped with exhaust gas and with the coolant. The result is a net reduction in heat loss during the cycle.

One more object of the present invention is to improve the efficiency of the airless engine by completing the cycle in two piston strokes, instead of four, which reduces the amount of friction work associated with the piston rubbing against the walls of the cylinder. This improves the efficiency.

Yet another object of the present invention is to reduce the structural complexity of the airless engine by integrating the exhaust manifold with the cylinder head, and using only one type of valve that remains open continuously during exhaust and intake strokes of the piston.

Another object of the present invention is to minimize the volume of the required gas storage by sequentially storing the oxygen and the carbon dioxide in the same container.

One more object of the present invention is to use sequestration of carbon dioxide, produced in the engine combustion, to convert it into hydrocarbon fuel to be used to power the engine.

Further objects and advantages of our invention will become apparent from a consideration of the drawings and ensuing description.

SUMMARY

The airless engine of the present invention is a piston-type internal combustion engine that inducts no air from outside atmosphere and exhausts no gas to outside atmosphere. Some of the exhaust gas is returned to (or retain in) the cylinder, where it serves as a diluent gas. That gas may be cooled before return to the engine. Each cylinder of the engine contains diluent gas that contains mostly carbon dioxide and water vapor. Each cylinder repeatedly receives fuel and oxygen and repeatedly performs a combustion cycle, in which fuel and oxygen are converted into carbon dioxide and water vapor. Water vapor is condensed and disposed of. Carbon dioxide is collected, stored and subsequently removed for longer term storage and sequestration.

One of the most important parameters of any internal combustion engine is its efficiency, which is determined by the ratio of useful work performed by the energy released in combustion. During gas expansion, some of that energy is transferred from the gas to the piston that performs the useful work, but a substantial part of that energy is carried out with the exhaust gas and the engine coolant, and serves no useful purpose. The main reasons for those losses are:
1. Insufficient gas expansion.
2. Pumping loss due to throttling.
3. Loss of heat to coolant and exhaust gas.
4. Mechanical friction.

The airless engine of the present invention can be designed and operated using methods that lead to reduction or elimination of the above energy losses, thus improving the engine efficiency. These methods involve the following:
1. Increasing the expansion ratio.
2. Elimination of throttling.
3. Recovery of lost heat.
4. Reducing friction.
5. Varying valve timing.

The present invention also includes the method of minimizing the volume of gas storage and the method of sequestering the carbon dioxide, produced in combustion, by converting it into fuel to power the engine. Carbon dioxide is captured, stored and subsequently sequestered by using it with water to create a hydrocarbon fuel that can be supplied back to the engine. In that way, the engine fuel is repeatedly regenerated and reused, and no additional fuel is required.

These methods are the subject of the present invention and are described below.

Increasing Expansion Ratio

Increasing the gas expansion increases the fraction of the gas energy transferred to the piston, thus improving the efficiency. However, increasing the gas expansion is limited by the fact that, in most engines, the expansion ratio is about equal to the compression ratio, which cannot be increased due to limitations in peak pressure and temperature in the engine. This, however, does not apply to engines operating in an overexpanded cycle (sometimes referred to as Atkinson cycle).

In an engine operating in overexpanded cycle, the expansion ratio is inherently much greater than the compression ratio, and this permits to achieve a much better efficiency. Practically, this is often achieved by the engine cylinder having a larger volume, with a longer piston stroke, than in a conventional engine of the same power. The longer stroke provides for greater expansion ratio, while the compression ratio and the inducted gas volume remain the same as in the above conventional engine.

A major disadvantage of the above method is a significant reduction in power density, because of the increase in engine volume. This disadvantage can be eliminated in an airless engine by modifying the engine and its operation as described in the present invention. Such engine can take full advantage of the significant improvement in efficiency, associated with the overexpanded cycle, and still deliver the same power as a conventional engine of equal cylinder volume. There is no reduction in power density.

An airless engine inducts no air from outside atmosphere and discharges no gas into the atmosphere. Most of its combustion gas is retained in or returned back into the engine cylinders, where it serves as a diluent gas. Fuel and oxygen are added to the diluent gas, and the mixture is used to perform combustion.

In a conventional air-inducting internal combustion engine, the gas contained in the cylinder is mostly nitrogen. In an airless engine, the cylinder gas is mostly carbon dioxide and water vapor, and the specific heat and density of that gas are substantially greater than the specific heat and density of the gas used in air-inducting engines. Thanks to this, a smaller mass of gas is required to absorb the heat of combustion in a cylinder in the airless engine than the mass of gas that is required to absorb an equal amount of combustion heat in a cylinder of equal volume in an air-inducting engine at equal operating conditions. Therefore the volume of gas contained in the cylinder of the airless engine at the beginning of gas compression can be substantially smaller than the volume of gas contained in a cylinder of equal volume in the air-inducting engine at the beginning of gas compression in that engine. This permits to develop an airless engine and a method of its operation that enables the airless engine to operate in overexpanded cycle without the need to increase the volume relative to the volume of conventional air-inducting engine of equal power.

In a piston-type internal combustion engine, the piston reciprocates in the engine cylinder, thus varying the volume of the cylinder chamber containing the gas participating in the engine cycle.

In a typical air-inducting engine, the volume of gas contained in that cylinder chamber at the beginning of gas compression is approximately equal to the volume of the entire cylinder, and the compression and expansion of that gas are about equal.

Consider an airless engine with a cylinder volume equal to the cylinder volume in the above air-inducting engine. In the airless engine of the present invention, the gas contained in the cylinder chamber at the beginning of gas compression occupies only a fraction of the full cylinder volume, and the gas compression takes up only a fraction of the piston stroke, while the gas expansion takes up the entire piston stroke. The clearance volume is reduced too, so that a desirable value of compression ratio is retained. Reduction in the clearance volume increases the expansion ratio, which remains substantially greater than the compression ratio, thus improving the engine efficiency. An increase in efficiency is achieved without increase in cylinder volume. There is no reduction in power density.

Elimination of Throttling

A conventional, Otto cycle internal combustion engine uses air for its operation. Oxygen, contained in that air, is used to combust the fuel, while the remaining gas, which is mostly nitrogen, serves as a diluent absorbing the heat and keeping the temperature in the cylinder within acceptable limits. Throttling of the intake air is used to control its flow.

In the airless engine, oxygen is supplied and controlled separately. The airless engine uses its own exhaust as a diluent instead of nitrogen. That gas, which is a mixture of carbon dioxide and water vapor, is reused as a diluent gas in the following cycle. Oxygen and fuel are added, and the resulting mixture is used to perform the combustion cycle. No air is inducted into the engine.

Some of the exhaust gas is in excess of the intake needs of the engine and is expelled from the engine system. The mass of the excess gas is equal to the mass of oxygen and fuel (and water, if any) added to the engine. It consists mostly of carbon dioxide mixed with a smaller fraction of water vapor. Water vapor is condensed and disposed of. What remains is carbon dioxide gas that is cooled to approximately constant temperature and flows into a compressor that is part of the carbon capture system. That gas represents the carbon dioxide created in combustion.

The engine gas flow system is arranged so that the pressure at the inlet to the compressor is equal to the pressure of the diluent gas flowing into or retained in the engine. The mass of the newly created carbon dioxide is proportional to the mass of fuel received into the engine. The compressor has constant displacement and it operates with a speed that varies in proportion to the changes in the speed of the engine.

Since the compressor displacement is fixed, and the compressor inlet gas temperature is approximately constant, any change in the mass of compressor inlet flow per cycle must be associated with a proportional change in its pressure, which is equal to the pressure of the engine diluent gas. Therefore the mass of the diluent gas in the engine automatically varies in proportion to changes in the fuel flow. The system is inherently self-regulating, and the mass of the diluent gas automatically changes in proportion to the changes in the mass flow of the fuel received into the engine. The gas-to-fuel ratio remains constant, and there is no need for throttling to control the flow of the inducted diluent gas. This reduces the pumping loss and contributes to better fuel efficiency.

Recovery of Lost Heat

An alternative to the above described concept is a concept, in which there is no outside cooling of the recirculated gas: The engine inducts hot exhaust gas, which is cooled by an in-cylinder water injection. In addition to fuel and oxygen injectors, the engine is equipped with water injectors for direct injection of water into the cylinders. Fuel and oxygen are directly injected too. The exhaust gas is discharged from each cylinder into the exhaust manifold during the blow-down and the exhaust stroke and some of it comes back from the exhaust manifold into the cylinder during the subsequent intake stroke and gets cooled by water injection. The rest of the cycle is the same as in the system described above. The excess gas flows, through a discharge pipe and through a catalyst, into a carbon capture system. The mass of the excess gas is equal to the cumulative mass of fuel, oxygen and water injected into the engine.

Bringing back hot gas brings back to the cylinder some of the heat that escaped from the cylinder previously. That heat adds to the heat of combustion and compensates for some of the heat that escaped with exhaust gas and with the coolant. The result is a net reduction in heat loss during the cycle.

Reducing Friction

A logical extension of the above-described four-stroke cycle concept is a concept, in which there is no intake of gas into the cylinder. It involves retaining the combustion gas in the cylinder at the end of the expansion stroke and discharging the excess gas during a part of the following stroke. The cycle is completed in two piston strokes, instead of four, which reduces the amount of friction work associated with the piston rubbing against the walls of the cylinder. This improves the efficiency.

Varying Valve Timing

In some modes of the engine operation, there is a need for a substantial increase in the power of the engine for a short period of time. A typical example is an automobile engine during the vehicle acceleration, which requires a substantial increase in fuel delivery to the engine for a short period of time. In that case, to avoid excessive increase in cylinder temperature, the amount of diluent gas should be increased too.

In the airless engine operating in overexpanding cycle, the amount of diluent gas inducted depends on the timing of the intake valve closure. The engine control system may include a variable valve timing control, which can be used to change the timing of closure of intake valve, at heavy engine load, so that the volume of gas contained in said cylinder chamber at the beginning of said gas compression is substantially increased and greater amounts of said fuel and oxygen are injected into said cylinder chamber. In this way, the required peak power is achieved with smaller engine displacement, whereby friction loss is reduced and, whereby the efficiency of said airless engine is improved.

Minimizing the Volume of Gas Storage

Internal combustion engines are frequently used to power transportation vehicles. The engine system of the present invention, when installed in a vehicle, requires an on-board gas-storage means for storage of carbon dioxide, produced in combustion, until that gas can be removed for longer term storage. In many cases, an on-board gas-storage means to store oxygen used in combustion is needed too.

In transportation vehicles, space is limited and the volume of the storage means for storing the carbon dioxide and oxygen should be minimized. The present invention offers a method of gas storage that minimizes the volume of that storage. It involves providing a plurality of gas containers, each capable of storing oxygen, at first, and storing carbon dioxide later. Storing oxygen and carbon dioxide sequentially in the same container minimizes the volume required.

Converting Carbon Dioxide and Water into Fuel

An attractive way to sequester the carbon dioxide, produced in the engine of the present invention, is to combine it with water in a chemical reaction that produces hydrocarbon fuel. A conversion apparatus receives carbon dioxide from the engine and uses it to produce hydrocarbon fuel and oxygen, which are supplied back to the engine. NASA received a U.S. Pat. No. 9,528,192 for conversion of carbon dioxide into fuel, using sunlight as a source of energy.

DESCRIPTION OF THE PREFERRED METHOD OF OPERATION

There are two methods for filling the engine cylinders with the diluent exhaust gas: gas recirculation and gas retention. The first method involves recirculating the exhaust gas from the exhaust manifold into the intake manifold. This is the preferred method of operation.

Figure 1:
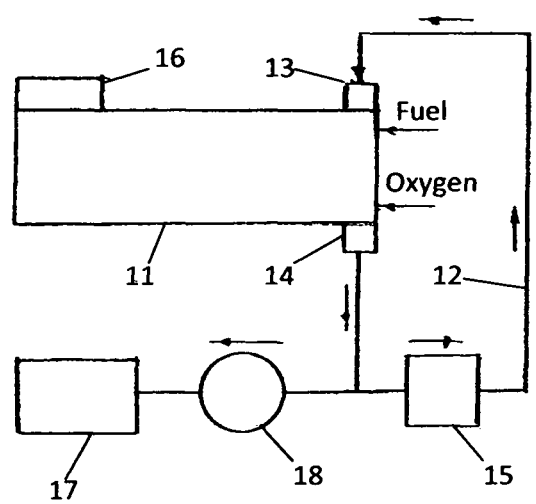
FIG. 1 is a schematic diagram illustrating an airless engine system with cooled exhaust gas recirculation.

FIG. 1 schematically illustrates the concept of the airless engine with gas recirculation. That arrangement includes an engine 11 receiving fuel and oxygen and a system of connecting pipes that form a gas-recirculation conduit 12 connecting the engine intake manifold 13 to the exhaust manifold 14. The gas-recirculation conduit 12 includes a gas cooler 15 for cooling the recirculated gas. The engine control unit 16 controls the cooling, to maintain the intake gas at sufficiently low, approximately constant temperature. There is no throttle at the inlet to the intake manifold. The engine is unthrottled, and the intake manifold pressure is always equal to the pressure in the gas-recirculation conduit. Oxygen and fuel are injected either into the intake flow, or directly into each cylinder.

Exhaust gas, expelled from each cylinder during each exhaust stroke, is split into two fractions: the recirculated gas fraction and the excess gas fraction. The recirculated gas fraction flows from the engine exhaust manifold 14, via the gas-recirculation conduit 12, into the engine intake manifold 13 and is inducted back into each cylinder during each intake stroke. The excess gas fraction contains the gas that is in excess of the intake needs of the engine. It flows through a catalyst 18 into a carbon-capture system 17. The pressure of gas in the excess gas fraction is equal to the pressure in the recirculated gas fraction.

Figure 2:
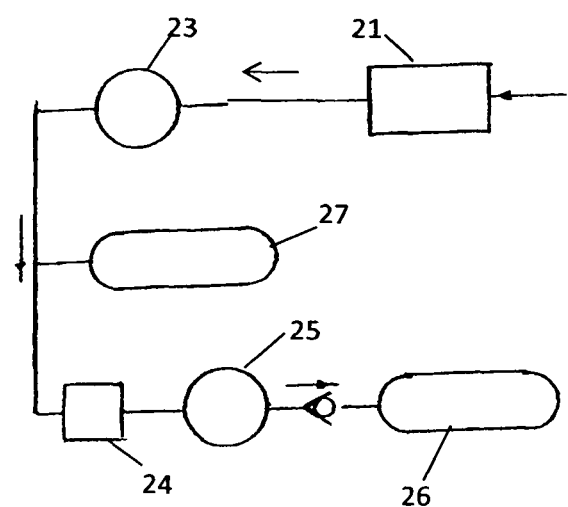
FIG. 2 is a schematic diagram illustrating a carbon capture system for the airless engine system.

FIG. 2 is a schematic diagram of the carbon-capture system 17 (FIG. 1). The excess gas, expelled from the engine system, flows into a water condenser 21, where it is cooled, and water vapor is condensed. Liquid water collects in a water collector and may be disposed of periodically (not shown). The remaining gas is mostly carbon dioxide, and it flows into an engine-driven constant-displacement compressor 23. The pressure at the inlet to the compressor 23 is still equal to the pressure in the excess gas fraction. That compressor pumps the gas, via a pressure regulator 24, into an electrically driven compressor 25, which is capable to compress the gas to a supercritical pressure. Then, the highly compressed carbon dioxide is deposited in a tank 26, where it cools and is stored as a liquid or a supercritical fluid.

The pressure regulator 24, at the inlet to the compressor 25, prevents the compressor from being overloaded by excessive gas flow during sudden increase in load and speed. At that time, the excessive flow is temporarily absorbed in a buffer tank 27. If the operation does not involve sudden increases in load and speed, the system may not include the pressure regulator 24 and tank 27. In that case, the compressor 23 pumps directly into the compressor 25.

In the engine of the present invention, the effective compression of the gas in the engine cylinder takes place only during a fraction of the piston stroke. This is accomplished by proper timings of openings and closings of the engine valves. Those timings are such that the volume of gas contained in each engine cylinder, at the beginning of the gas effective compression, is substantially smaller than the volume of gas contained in that cylinder at the end of combustion gas expansion. The effective compression is compression that begins with starting pressure equal to or higher than the intake pressure.

Figure 3:
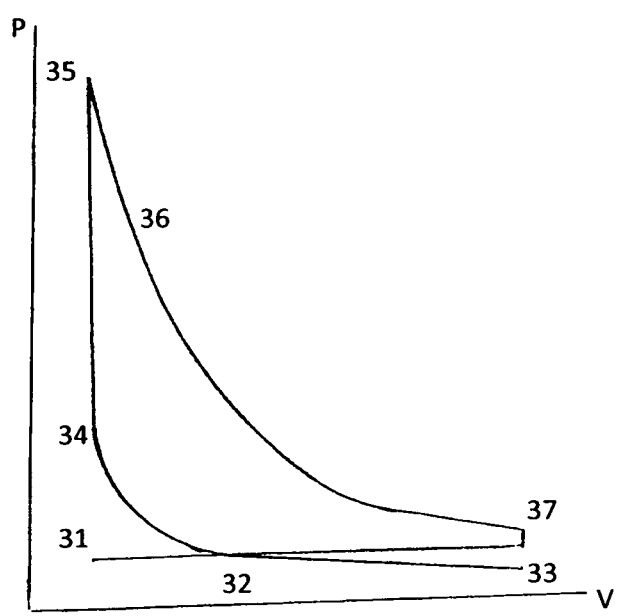
FIG. 3 is a pressure-volume diagram of the cycle for the airless engine of FIG. 1 operating with early intake valve closing.

FIG. 3 illustrates a simplified pressure-volume diagram of one variant of the above preferred method. In the engine, the reciprocating motion of the pistons continuously varies the volume of the cylinder chamber in each cylinder. At the beginning of the cycle, the intake valve opens when the volume of the cylinder chamber is close to its minimum and, during the first part of the first volume-increasing stroke, from point 31 to point 32, the recirculated gas is inducted from the gas-recirculation conduit. The intake valve closes early at point 32 and, during the second part of the first volume-increasing stroke from point 32 to point 33, the inducted gas expands. Fuel and oxygen are injected either into the gas-recirculation conduit, or directly into the cylinder chamber. In either case, a combustion mixture forms in the cylinder chamber.

During the first part of the first volume-decreasing stroke, from point 33 to point 32, the gas is compressed, and its initial pressure is restored. During the second part of the first volume-decreasing stroke, from point 32 to point 34, the effective compression of the gas takes place. When the volume of the cylinder chamber is close to its minimum again, the combustion mixture is ignited, and the initial combustion raises the pressure almost instantaneously (from point 34 to point 35). The combustion continues during the first part of the second volume-increasing stroke, from point 35 to point 36, followed by expansion of combustion gas during the second part of the second volume-increasing stroke, from point 36 to point 37.

The exhaust valve opens when the volume of the cylinder chamber is close to its maximum and, during the second volume-decreasing stroke from point 37 to point 31, there is a blowdown and the combustion gas is expelled from the cylinder chamber into the gas-recirculation conduit and into the carbon-capture system. The exhaust valve closes when the volume of the cylinder chamber is close to its minimum again. The gas expelled into the gas-recirculation conduit is cooled in the gas cooler 15 (FIG. 1) and flows back into the engine.

Figure 4:
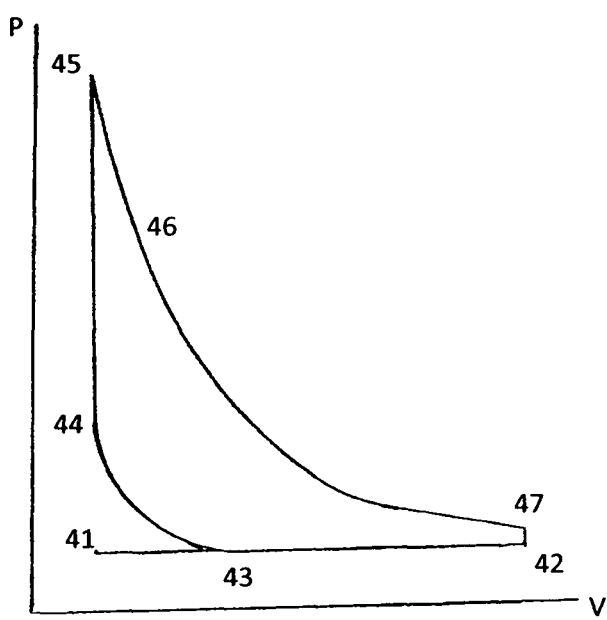
FIG. 4 is a pressure-volume diagram of the cycle for the airless engine of FIG. 1 operating with late intake valve closing.

FIG. 4 illustrates a simplified pressure-volume diagram of another variant of the above preferred method. This one employs a late intake valve closing. The intake valve opens when the volume of the cylinder chamber is close to its minimum and, during the first volume-increasing stroke from point 41 to point 42, the recirculated gas is inducted from the gas-recirculation conduit.

During the first part of the first volume-decreasing stroke, from point 42 to point 43, some of the gas is pushed back into the gas-recirculation conduit. The intake valve closes late, at point 43, fuel and oxygen are injected, and a combustion mixture forms in the cylinder chamber. During the second part of the first volume-decreasing stroke, from point 43 to point 44, the effective compression of the gas takes place. When the volume of the cylinder chamber is close to its minimum again, the combustion mixture is ignited, and the initial combustion raises the pressure almost instantaneously (from point 44 to point 45). Combustion continues during the first part of the second volume-increasing stroke, from point 45 to point 46, followed by expansion of combustion gas during the second part of the second volume-increasing stroke, from point 46 to point 47.

The exhaust valve opens when the volume of the cylinder chamber is close to its maximum and, during the second volume-decreasing stroke from point 47 to point 41, there is a blowdown and the combustion gas is expelled from the cylinder chamber into the gas-recirculation conduit and into the carbon-capture system. The exhaust valve closes when the volume of the cylinder chamber is close to its minimum again. The gas expelled into the gas-recirculation conduit is cooled in the gas cooler 15 (FIG. 1) and flows back into the engine.

Figure 5:
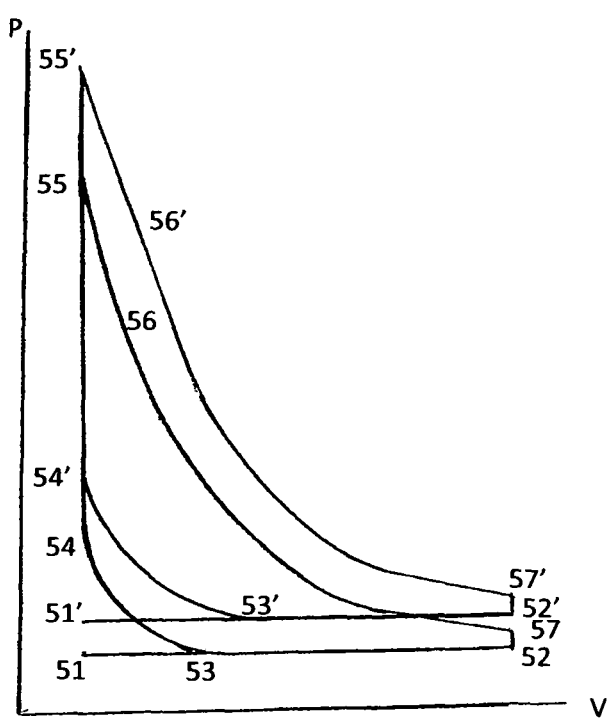
FIG. 5 illustrates pressure-volume diagrams of the cycle for the airless engine of FIG. 1 operating with variable intake valve timing.

Varying the timing of the intake valve closure permits varying the volume of the inducted exhaust gas. For this, the engine must be equipped with a variable valve timing control. FIG. 5 illustrates two overlapping pressure-volume diagrams of a cycle like the above described, in which a variable valve control leads to an increase in peak power without an increase in engine volume.

The base cycle is: 51-52-53-54-55-56-57-51, the intake valve closes at point 53 and the volume of the recirculated diluent gas subject to compression is 51-53. In the modified cycle, the timing of the intake valve closure is changed to point 53' and the volume of the diluent gas becomes 51'-53', which is greater than the original volume 51-53. This permits an increase in fuel and oxygen injected, and the cycle becomes: 51'-52'-53'-54'-55'-56'-57'-51'. The power of the engine is substantially increased, without an increase in the engine volume. Alternatively, this means that, with variable valve control, the required peak power can be achieved with smaller engine displacement. Smaller engine has less friction and better efficiency.

Description of the First Alternative Method of Operation

Figure 6:
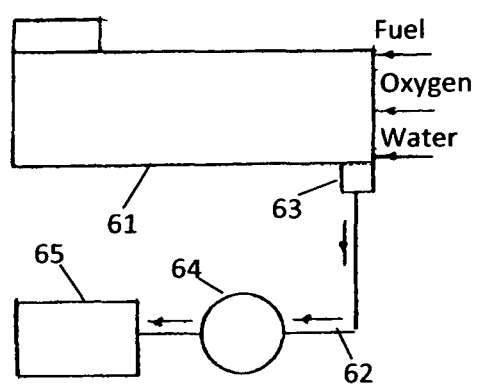
FIG. 6 is a schematic diagram illustrating an airless engine system with hot exhaust gas return or retention.

This is a method, in which there is no outside cooling of the exhaust gas retained in the engine. The engine cylinders induct hot exhaust gas, which is cooled by an in-cylinder water injection. Such a concept is illustrated in FIG. 6. In addition to fuel and oxygen injectors, the engine is equipped with water injectors for direct injection of water into the cylinders. Fuel and oxygen are directly injected too. There is no transfer conduit, only a discharge pipe 62, and the engine has no intake valves and no intake manifold. There is only an exhaust system.

The exhaust gas is discharged from each cylinder into the exhaust manifold 63 during the blowdown and the exhaust stroke and some of it comes back into the cylinder during the subsequent intake stroke and gets cooled by water injection. The rest of the cycle is the same as in the system of FIG. 1. The excess gas flows, through the discharge pipe 62 and through a catalyst 64, into a carbon capture system 65. The mass of the excess gas is equal to the cumulative mass of fuel, oxygen and water injected into the engine. The carbon capture system is conceptually the same as illustrated in FIG. 2, but the capacity of the water condenser must be sufficient to handle the additional water.

Figure 7:
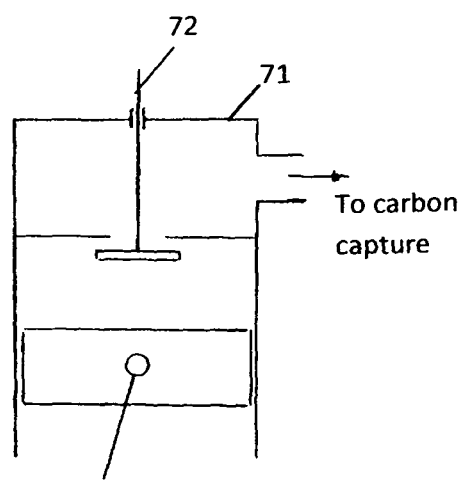
FIG. 7 is a schematic diagram illustrating a cylinder in an airless engine with exhaust manifold integrated with the engine cylinder head.

Gas exchange is greatly simplified: Elimination of intake valves frees additional space in the cylinder head, and the exhaust manifold 71 is integrated with the head, as illustrated in FIG. 7. There is only one type of valve, the exhaust valve 72, which performs both the intake and exhaust functions. The valves, in each cylinder, remain open during the entire exhaust and intake period.

Figure 8:
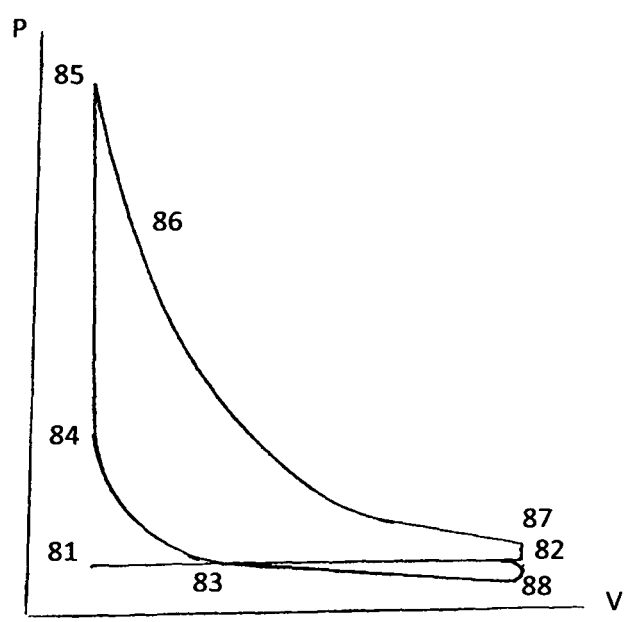
FIG. 8 is a pressure-volume diagram for the airless engine of FIG. 6 operating in four-stroke cycle with hot gas return.

FIG. 8 illustrates a pressure-volume diagram of the above cycle. At the beginning of the intake stroke, the exhaust valve 72 (FIG. 7) is fully open and, from point 81 to point 82, intake of hot gas takes place. When the piston is in the vicinity of the BDC, the valve closes and cooling water is injected, reducing the temperature and the pressure in the cylinder to point 88. The cooling water turns into steam that performs useful work in the cycle. During the compression stroke, from point 88, via point 83, to point 84, gas compression takes place. The effective compression is 83-84, 84-85-86 is the combustion and expansion, and 86-87 is continuation of the expansion. When the piston is in the vicinity of the BDC again, the valve opens and, from point 87 to point 81, the gas is expelled from the cylinder. The expansion 85-86-87 is much greater than the effective compression 83-84. This is still an overexpanded cycle. Advancing or retarding the timing of the valve closure varies the quantity of the exhaust gas returned to the cylinder chamber.

Bringing back the hot gas brings back to the cylinder some of the heat that escaped from the cylinder previously. That heat adds to the heat of combustion and compensates for some of the heat that escaped with exhaust gas and was lost to the coolant. The result is a net reduction in heat loss during the cycle and improvement in efficiency.

Description of the Second Alternative Method of Operation

This is a method that involves a two-stroke cycle, in which there is no intake of gas into the cylinder. There is only gas exhaust. The volume-decreasing stroke of the piston consists of two parts, the first part and the second part. The cycle involves discharging an excess fraction of combustion gas from the cylinder chamber during the first part of the volume-decreasing stroke, and retaining the remaining fraction of combustion gas in the cylinder. Cooling water is injected and its evaporation cools the remaining gas. The rest of the cycle is the same as in the system of FIG. 6.

The diagrams of the system are the same as in FIG. 6 and FIG. 7, but the valve 72 (FIG. 7) serves only as exhaust valve. The excess gas flows, through the discharge pipe 62 (FIG. 6) and through a catalyst 64, into a carbon capture system 65. The mass of the excess gas is equal to the cumulative mass of fuel, oxygen and water injected into the engine. The carbon capture system is conceptually the same as illustrated in FIG. 2, but the capacity of the water condenser must be sufficient to handle the additional water.

Figure 9:
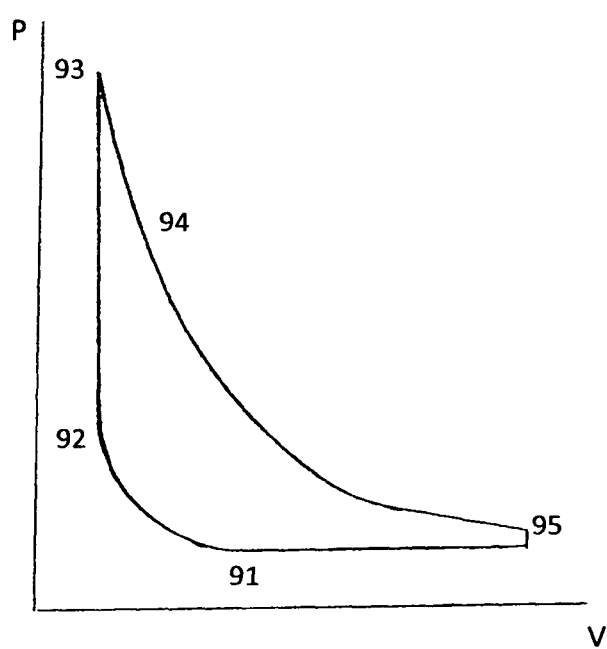
FIG. 9 is a pressure-volume diagram for the airless engine of FIG. 6 operating in two-stroke cycle with hot gas retention.

A pressure-volume diagram of such cycle is shown in FIG. 9. The valve 72 (FIG. 7) closes at point 91 and, from point 91 to point 92, compression takes place. During that time, water, oxygen and fuel are injected into the retained gas. The cooling water turns into steam that performs useful work in the cycle. Steam formation in reduced cylinder volume, at point 91, cancels out pressure reduction associated with gas cooling. 92-93-94 is the combustion and expansion and 94-95 is continuation of the expansion. At the end of the expansion, the valve opens and, from point 95 to point 91, the excess gas is expelled from the cylinder. Then the cycle is repeated during the next revolution. The expansion 93-94-95 is much greater than the compression 91-92. This is still an overexpanded cycle. Advancing or retarding the timing of the valve closure varies the quantity of the exhaust gas retained in the cylinder chamber.

The cycle is completed in two piston strokes, instead of four, which reduces the amount of friction work associated with the piston rubbing against the walls of the cylinder. This improves the efficiency.

Retaining the hot gas retains more heat in the cylinder. That heat adds to the heat of combustion and compensates for some of the heat that escaped with exhaust gas and was lost to the coolant. The result is a net reduction in heat loss during the cycle and improvement in efficiency.

In both the first and the second alternative methods of operation, the engine system may be equipped with a variable valve timing system, which permits a temporary increase in power, as it was described in the description of the preferred method of operation.

DESCRIPTION OF THE METHOD TO MINIMIZE THE VOLUME OF GAS STORAGE

Internal combustion engines are frequently used to power transportation vehicles. The engine system of the present invention, when installed in a vehicle, requires an on-board gas-storage means for storage of carbon dioxide, produced in combustion, until that gas can be removed for longer term storage. In many cases, an on-board gas-storage means to store oxygen used in combustion is needed too.

In transportation vehicles, space is limited and the volume of the storage means for storing the carbon dioxide and oxygen should be minimized. The present invention offers a method of gas storage that minimizes the volume of that storage. That method involves providing a plurality of gas containers, each capable of storing oxygen, at first, and storing carbon dioxide at a later time. Storing oxygen and carbon dioxide sequentially in the same container minimizes the volume required.

Figure 10A:
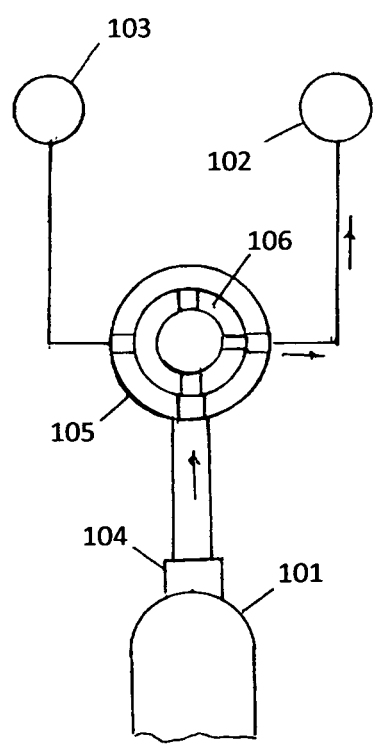
FIGS. 10A and 10B show an example of a gas storage container that can be selectively connected either to the oxygen-induction system, or to the carbon capture system.
Figure 10B:
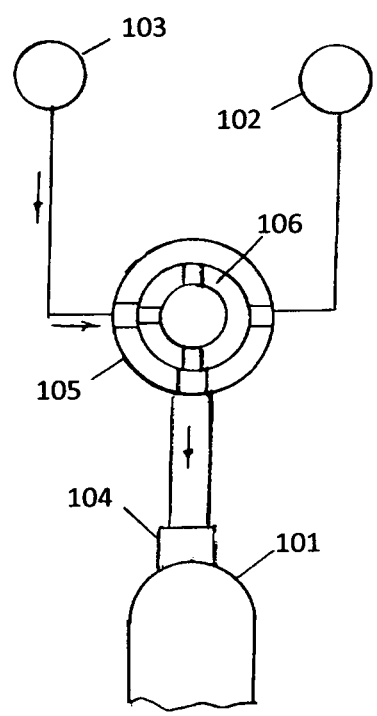

More specifically, the above method involves providing an oxygen-induction system containing oxygen intended for engine combustion and a carbon-capture system containing carbon dioxide produced in engine combustion, and it further involves providing a set of gas-storage containers comprising one empty gas-storage container and a plurality of gas-storage containers filled with oxygen, wherein each gas-storage container, in said set of gas-storage containers, has an inlet valve and a gas-flow distributor, wherein said inlet valve can selectively connect and disconnect the interior of said gas-storage container to and from said gas-flow distributor, and wherein said gas-flow distributor can be selectively connected either to said oxygen-induction system or to said carbon-capture system, whereby the interior of said gas-storage container can be selectively connected either to said oxygen induction system or to said carbon-capture system, FIGS. 10A and 10B show an example of a gas-storage container 101 that can be selectively connected either to an oxygen-induction system 102, or to a carbon-capture system 103. An inlet valve 104 is open only when gas-storage container 101 is active and gas is charged into or discharged from that gas-storage container. When inlet valve 104 is open, it connects gas-storage container 101 to a gas-flow distributor 105, which contains a two-position rotary valve 106.

In FIG. 10A, inlet valve 104 is open. It shows rotary valve 106 in its first position, in which it connects the interior of gas-storage container 101 to oxygen-induction system 102. In this position of valve 106, oxygen is discharged from gas-storage container 101 into the oxygen-induction system 102. FIG. 10B shows rotary valve 106 in its second position, in which it connects the interior of gas-storage container 101 to carbon-capture system 103. In that position, gas-storage container 101 is charged with carbon dioxide from carbon-capture system 103.

Figure 11A:
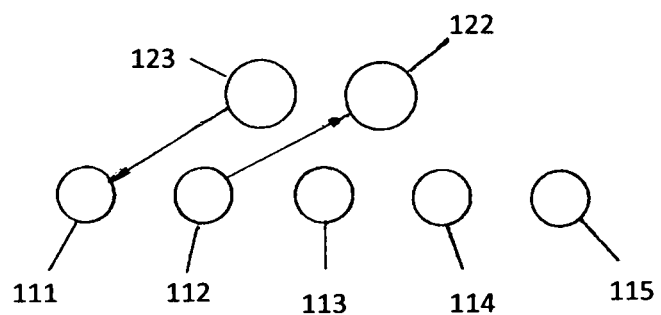
FIGS. 11A and 11B show an example of how a group of containers can be sequentially discharged of oxygen and charged with carbon dioxide.
Figure 11B:
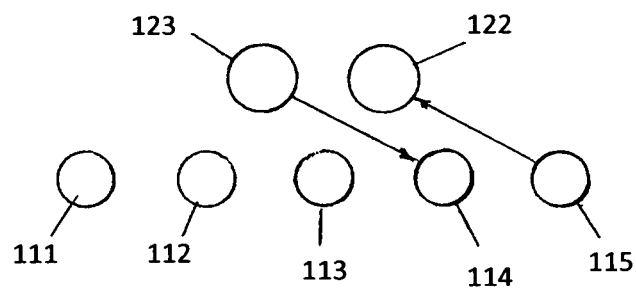

FIGS. 11A and 11B illustrate an example of how five containers, 111 thru 115, can be sequentially discharged of oxygen and charged with carbon dioxide. Initially, container 111 is practically empty (internal pressure close to atmospheric pressure), and containers 112 to 115 are filled with compressed oxygen.

In FIG. 11A, container 111 is connected to carbon-capture system 123 and is charged with carbon dioxide, while container 112 is connected to oxygen-induction system 122 and discharges oxygen into that system. Containers 113 to 115 remain inactive with their inlet valves closed.

When container 111 is fully charged with carbon dioxide and container 112 is practically empty, the inlet valve in container 111 closes, trapping the carbon dioxide there. Then, the above process is repeated with containers 112 and 113. Container 112 is charged with carbon dioxide, while container 113 discharges oxygen.

The above process is repeated sequentially with containers 113 and 114, and with containers 114 and 115. FIG. 11B illustrates the last stage, when container 114 is charged with carbon dioxide and container 115 discharges its oxygen. After that, containers 111 thru 114 are filled with carbon dioxide, container 115 is empty, and the storage system is ready for unloading the collected carbon dioxide and to be recharged with fresh supply of oxygen.

Description of Fuel and Oxygen Regeneration

The engine of the present invention anticipates a fuel and oxygen regeneration process, in which the carbon dioxide, produced in the engine of the present invention, is to be used with water in a chemical reaction in a conversion apparatus that produces hydrocarbon fuel and oxygen. Those fuel and oxygen are supplied back to the engine, where they convert into carbon dioxide and water again. That process of fuel regeneration can be repeated again and again indefinitely, as long as small amounts of supplemental carbon dioxide and supplemental oxygen are added to compensate for carbon dioxide lost to leakage and for excess oxygen used in the cycle. With good engineering, gas leakage can be very small, but it is not zero. Alternatively, fuel can be added, instead of adding carbon dioxide.

Figure 12:
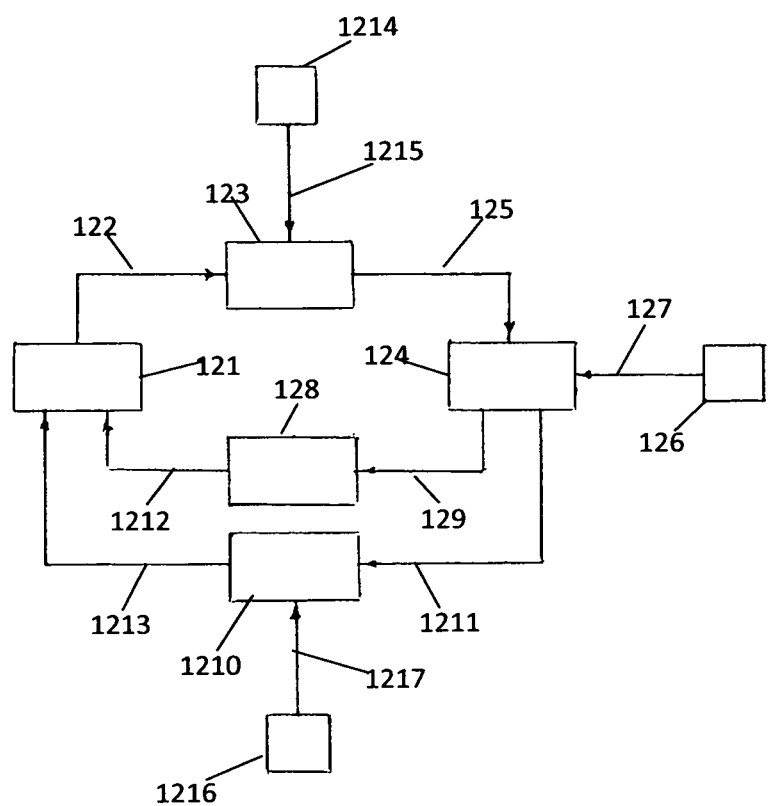
FIG. 12 is a schematic diagram illustrating sequestration of carbon dioxide by converting it into fuel that is supplied back to the engine.

FIG. 12 schematically illustrates the concept of sequestering the carbon dioxide produced in engine combustion by converting it into fuel and oxygen that are used to power the engine. Engine system 121 produces carbon dioxide and discharges it via gas conduit 122 into carbon dioxide storage 123. Conversion apparatus 124 receives carbon dioxide from carbon dioxide storage 123 via conduit 125, and it receives water from a water source 126 via conduit 127. Conversion apparatus 124 uses the carbon dioxide and water to produce fuel and oxygen, and it discharges the produced fuel into fuel storage 128 via conduit 129, while the produced oxygen is discharged into oxygen storage 1210 via conduit 1211. From fuel storage 128 and oxygen storage 1210, the fuel and oxygen are supplied to engine system 121 via conduits 1212 and 1213, respectively. Supplemental carbon dioxide is supplied from carbon dioxide source 1214 to carbon dioxide storage 123 via conduit 1215. Supplemental oxygen is supplied from oxygen source 1216 to oxygen storage 1210 via conduit 1217. It is assumed that supplying the engine with fuel and oxygen takes place at about the same time as discharge of carbon dioxide.

CONCLUSION, RAMIFICATIONS AND SCOPE

The engine system of the present invention can have a very positive effect on the environment. The engine receives no air from outside atmosphere and discharges no gas into outside atmosphere. Therefore, in contrast to conventional internal combustion engines that discharge exhaust gas into the atmosphere, the engine of the present invention discharges no harmful gas into the outside air, thus contributing to cleaner and healthier air environment. Since no carbon dioxide is released into the atmosphere, operation of the engine of the present invention has no adverse effect on the Earth climate.

The engine of the present invention can be considerably more efficient than a conventional air-breathing engine. That is because the diluent gas used in the engine of the present invention is mostly carbon dioxide and water vapor, and the specific heat and density of that gas are substantially greater than the specific heat and density of the diluent gas used in air-inducting engines. This permits the engine of the present invention to operate in overexpanded cycle (Atkinson cycle), without increasing the size of the engine relative to the size of conventional engine operating in Otto cycle. Atkinson cycle is considerably more efficient than the Otto cycle commonly used in conventional air-breathing engines.

The engine of the present invention needs no throttle to control the mass of its diluent gas. The mass of the diluent gas in the engine varies automatically in proportion to changes in the fuel flow. The gas-to-fuel ratio remains constant, and there is no need for throttling to control the flow of the inducted diluent gas. This reduces the pumping loss and further contributes to better fuel efficiency.

The engine of the present invention can operate with no outside cooling of the diluent gas. The engine can induct hot exhaust gas, which is cooled by an in-cylinder water injection. Bringing back hot gas brings back to the cylinder some of the heat that escaped from the cylinder previously. That heat adds to the heat of combustion and compensates for some of the heat that escaped with exhaust gas and with the coolant. The result is a net reduction in heat loss during the cycle. This is a further improvement in the efficiency.

The engine of the present invention anticipates a fuel and oxygen regeneration process, in which the carbon dioxide, produced in the engine of the present invention, is to be used with water in a chemical reaction in a conversion apparatus that produces hydrocarbon fuel and oxygen. Those fuel and oxygen are supplied back to the engine, where they convert into carbon dioxide and water again. That process of fuel and oxygen regeneration can be repeated again and again indefinitely, as long as small amounts of carbon dioxide and oxygen are added to compensate for carbon dioxide lost to leakage and for the excess oxygen used in combustion. In that way, the engine fuel is repeatedly regenerated and reused, and the engine operates in a carbon neutral mode of operation.

Although the description above contains much specificity, this should not be construed as limiting the scope of the invention, but as merely providing illustrations of some of the presently preferred embodiments of this invention. For example, it was assumed that the above described engine and methods of operation use an injectable liquid hydrocarbon fuel. However, the concept of the present invention also applies to engines that use other types of fuels (for example gaseous fuel) that may be added to the recirculated gas before it enters the engine. The concept is not limited to reciprocating-piston-type engines. It also applies to rotary-type internal combustion engines such as Wankel rotary engine and to gas turbines.

Thus the scope of the invention should be determined by the appended claims and their legal equivalents, rather than by the examples given.

We claim:

1. A method for operating and controlling an internal combustion engine system, said method comprising the steps of:

a) providing an airless internal combustion engine that inducts no air from outside atmosphere and exhausts no gas to outside atmosphere, said engine including at least one cylinder, a cylinder chamber within said at least one cylinder and a piston that can reciprocate in said at least one cylinder varying volume of said cylinder chamber, said cylinder chamber containing diluent combustion gas that contains mostly carbon dioxide and water vapor, said airless engine repeatedly receiving fuel and oxygen into said cylinder chamber and repeatedly performing a combustion cycle that includes gas induction into said cylinder chamber, gas compression, combustion and gas expansion in said cylinder chamber and expulsion of combustion gas from said cylinder chamber, wherein said combustion gas expelled from said cylinder chamber contains mostly carbon dioxide and water vapor, wherein said combustion gas expelled from said cylinder chamber is split into two fractions: a recirculated gas fraction and an excess gas fraction, wherein specific heat and density of gas during combustion in said airless engine are substantially greater than specific heat and density of gas during combustion in an air-inducting engine, whereby a smaller mass of gas is required to absorb the heat of combustion in said at least one cylinder in said airless engine than the mass of gas required to absorb an equal amount of combustion heat in a cylinder of equal volume in an air-inducting engine with gas expansion equal to gas compression, said at least one cylinder including at least one intake valve, at least one exhaust valve and means for repeatedly performing openings and closings of said at least one intake valve and said at least one exhaust valve, wherein timings of said openings and closings are such that the gas contained in said at least one cylinder at the beginning of said gas effective compression occupies only a fraction of the full cylinder volume, and said gas compression takes up only a fraction of the piston stroke, while said gas expansion takes up the entire piston stroke, whereby said gas expansion is substantially greater than said gas compression, and whereby said airless engine operates in overexpanded cycle, wherein the volume of gas contained in said at least one cylinder in said airless engine at the beginning of said gas compression is smaller than the volume of gas contained in said cylinder of equal volume in said air-inducting engine at the beginning of gas compression, wherein the volume of gas contained in said at least one cylinder in said airless engine at the end of said gas expansion is equal to the volume of gas contained in said cylinder of equal volume in said air-inducting engine at the end of gas expansion, and wherein clearance volume in said at least one cylinder in said airless engine is substantially smaller than clearance volume in said cylinder of equal volume in said air-inducting engine, whereby said gas expansion in said airless engine is substantially greater than gas expansion in said air-inducting engine, whereby greater gas expansion contributes to improvement in said airless engine thermodynamic cycle efficiency, and whereby said improvement in said airless engine thermodynamic cycle efficiency is achieved without an increase in cylinder size, said airless engine further including a gas-recirculation means for cooling and flowing said recirculated gas fraction from said at least one exhaust valve to said at least one intake valve, said gas-recirculation means including a gas cooler means for cooling said recirculated gas fraction, (b) providing a carbon-capture means for receiving and handling said excess gas fraction expelled from said cylinder chamber, said carbon-capture means comprising:

(1) a water-condensation means for receiving said excess gas fraction from said cylinder chamber, condensing water vapor contained in said excess gas fraction and cooling the remaining gas, (2) a water-storage container, (3) a first compressor that has a constant displacement and operates with a variable speed that varies in direct proportion to changes in the speed of said engine,
(4) a second compressor, and
(5) a carbon-dioxide-storage container, (c) providing a gas flow means for flowing gas between various parts of said system, (d) providing a source of fuel and a source of oxygen, (e) providing a fuel-delivery means and an oxygen-delivery means for delivering said fuel and said oxygen to said airless engine, (f) providing a control means for controlling the operation of said internal combustion engine system in response to operator's demand and in accordance with a control program incorporated in said control means, said control means including a manual implement for generating and varying a control signal expressing said operator's demand, (g) operating said airless engine by repeatedly performing said combustion cycle that includes recirculated gas induction from said gas-recirculation means into said cylinder chamber, fuel and oxygen induction into said cylinder chamber, gas compression, combustion and expansion in said cylinder chamber and expulsion of combustion gas from said cylinder chamber, wherein said gas expansion is substantially greater than said gas compression, wherein said combustion gas expelled from said cylinder chamber is split into two fractions: a recirculated gas fraction flowing into said gas-recirculation means and an excess gas fraction flowing into said carbon-capture means, wherein the pressure of gas flowing into said gas-recirculation means is equal to the pressure of gas flowing into said carbon-capture means, wherein the mass of said excess gas fraction flowing into said carbon-capture means is equal to the mass of said fuel and oxygen flowing into said airless engine, and wherein the mass of carbon dioxide contained in said excess gas fraction flowing into said carbon-capture means is proportional to the mass of fuel inducted into said engine, (h) operating said carbon-capture means by performing the steps of:
(1) repeatedly receiving said excess gas fraction expelled from said cylinder chamber into said water-condensation means, condensing water vapor contained in said excess gas fraction, collecting water in said water-storage container and cooling the remaining gas to a pre-determined temperature, wherein the remaining gas is mostly carbon dioxide gas,
(2) receiving said carbon dioxide gas from said water-condensation means into said first compressor, wherein the average mass of said carbon dioxide gas received into said first compressor is proportional to said average mass of said fuel received into said airless engine, wherein the gas pressure at the inlet to said first compressor varies in direct proportion to changes in the mass of said fuel flowing into said airless engine, wherein the gas pressure at the inlet to said first compressor is equal to the pressure of said excess gas fraction, wherein the gas pressure at the inlet to said first compressor is equal to the pressure of said recirculated gas fraction, and wherein the mass of said recirculated gas flowing into said airless engine varies in direct proportion to changes in the mass of said fuel flowing into said airless engine, whereby there is no need to use gas throttling to control the flow of said recirculated gas into said airless engine, whereby elimination of the pumping loss, associated with said gas throttling, contributes to improvement in said airless engine efficiency, and whereby the gas-to-fuel ratio in said airless engine remains constant, (3) compressing said carbon dioxide gas in said first compressor and flowing compressed carbon dioxide gas into said second compressor,
(4) receiving said compressed carbon dioxide gas from said first compressor into said second compressor,
(5) further compressing said compressed carbon dioxide gas in said second compressor and discharging further compressed carbon dioxide gas into said carbon-dioxide-storage container, and
(6) cooling and storing said further compressed carbon dioxide gas in said carbon-dioxide-storage container, wherein carbon dioxide is stored as a liquid or as a supercritical fluid, (i) controlling the operation of said internal combustion engine system by manually varying said control signal, wherein said control means responds to the change in said control signal by performing the steps of:
(1) varying the mass of said fuel received into said cylinder chamber to satisfy said operator's demand for said airless engine speed and power,
(2) varying the mass of said oxygen received into said cylinder chamber to satisfy the conditions for efficient combustion of said fuel in accordance with said control program incorporated in said control means,
(3) varying other operating factors in said airless engine in accordance with said control program incorporated in said control means, said operating factors including ignition timing and injection timing, whereby, thanks to reduced volume of gas contained in said at least one cylinder at the beginning of said compression and a proportional reduction in clearance volume in said at least one cylinder, an increase in expansion ratio is achieved, while the compression ratio remains unchanged, whereby said increase in expansion ratio is accomplished without an increase in volume of said at least one cylinder, whereby said increase in expansion ratio improves the efficiency of said airless engine, whereby said improvement in efficiency of said airless engine is achieved without a reduction in said engine power density, whereby, thanks to flowing said carbon dioxide gas into a compressor that has a constant displacement and operates with a speed that is proportional to the speed of said airless engine, the mass flow of said recirculated gas varies in proportion to said mass flow of fuel into said airless engine, whereby no throttling is needed to control the flow of said recirculated gas, whereby elimination of throttling loss further contributes to improved efficiency of said airless engine, and whereby gas-to-fuel ratio in said airless engine remains constant regardless of changes in said engine load.

2. The method of claim 1 wherein the step of operating said airless engine includes the steps of:
(1) opening said at least one intake valve when the volume of said cylinder chamber is close to its minimum, (2) inducting gas from said gas-recirculation means into said cylinder chamber during the first part of said piston first volume-increasing stroke,
(3) closing said at least one intake valve,
(4) expanding said gas in said cylinder chamber during the second part of said piston first volume-increasing stroke,
(5) receiving fuel and oxygen into said cylinder chamber, whereby a combustion mixture is formed in said cylinder chamber,
(6) compressing said combustion mixture in said cylinder chamber during the first part of said piston first volume-decreasing stroke, whereby the initial pressure in said cylinder chamber is restored,
(7) performing effective compression of said combustion mixture in said cylinder chamber during the second part of said piston first volume-decreasing stroke,
(8) igniting said combustion mixture when the volume of said cylinder chamber is close to its minimum,
(9) performing expansion and combustion of said combustion mixture during the first part of said piston second volume-increasing stroke, whereby said combustion mixture converts into combustion gas containing carbon dioxide and water vapor,
(10) expanding said combustion gas during the second part of said piston second volume-increasing stroke,
(11) opening said at least one exhaust valve when the volume of said cylinder chamber is close to its maximum,
(12) expelling said combustion gas from said cylinder chamber into said gas-recirculation means and into said carbon-capture means during the second volume-decreasing stroke of said piston, wherein the gas pressure in said gas-recirculated means is equal to the gas pressure in said carbon-capture means, and wherein the mass of gas flowing into said carbon-capture means is equal to the mass of said fuel and oxygen flowing into said airless engine,
(13) closing said at least one exhaust valve when the volume of said cylinder chamber is close to its minimum, and
(14) receiving said recirculated gas fraction of said combustion gas expelled from said cylinder chamber into said gas-recirculation means, cooling it in said gas-recirculation means and flowing it from said at least one exhaust valve to said at least one intake valve,
whereby the volume of gas contained in said cylinder chamber at the beginning of said gas effective compression is determined by the timing of the early closure of said at least one intake valve.

3. The method of claim 1 wherein the step of operating said airless engine includes the steps of:
(1) opening said at least one intake valve when the volume of said cylinder chamber is close to its minimum,
(2) inducting gas from said gas-recirculation means into said cylinder chamber during said piston first volume-increasing stroke,
(3) discharging said gas from said cylinder chamber into said gas-recirculation means during the first part of said piston first volume-decreasing stroke,
(4) closing said at least one intake valve,
(5) receiving fuel and oxygen into said cylinder chamber, whereby a combustion mixture is formed in said cylinder chamber,
(6) performing compression of said combustion mixture in said cylinder chamber during the second part of said piston first volume-decreasing stroke,
(7) igniting said combustion mixture when the volume of said cylinder chamber is close to its minimum,
(8) performing expansion and combustion of said combustion mixture during the first part of said piston second volume-increasing stroke, whereby said combustion mixture converts into combustion gas containing carbon dioxide and water vapor,
(9) expanding said combustion gas during the second part of said piston second volume-increasing stroke,
(10) opening said at least one exhaust valve when the volume of said cylinder chamber is close to its maximum,
(11) expelling said combustion gas from said cylinder chamber into said gas-recirculation means and into said carbon capture means during the second volume-decreasing stroke of said piston, wherein the gas pressure in said gas-recirculated means is equal to the gas pressure in said carbon-capture means, and wherein the mass of gas flowing into said carbon-capture means is equal to the mass of said fuel and oxygen flowing into said airless engine,
(12) closing said at least one exhaust valve when the volume of said cylinder chamber is close to its minimum, and
(13) receiving said recirculated gas fraction of said combustion gas expelled from said cylinder chamber into said gas-recirculation means, cooling it in said gas-recirculation means and flowing it from said at least one exhaust valve to said at least one intake valve,
whereby the volume of gas contained in said cylinder chamber at the beginning of said gas compression is determined by the timing of the late closure of said at least one intake valve.

4. The method of claim 1 wherein the step of providing said carbon-capture means includes the step of providing a compressor-protection system including a pressure regulator installed before the inlet to said second compressor, and a short-term-storage reservoir installed before the inlet to said pressure regulator, wherein said pressure regulator prevents excessive pressure at the inlet to said second compressor and wherein said short-term-storage reservoir temporarily absorbs excessive flow of gas, whereby said second compressor is protected against temporary excessive increase in inlet pressure.

5. The method of claim 1 wherein said control system includes a variable valve timing control, said control system using said variable valve timing control to change the timing of closure of said at least one intake valve, at heavy engine load, so that the volume of gas contained in said cylinder chamber at the beginning of said gas effective compression is substantially increased and greater amounts of said fuel and oxygen are injected into said cylinder chamber, wherein power of said airless engine is substantially increased, whereby the required peak power is achieved with smaller engine displacement, whereby friction loss is reduced and, whereby the efficiency of said airless engine is improved.

6. The method of claim 1 wherein said system includes an on-board gas-storage means, said gas-storage means performing a process of sequentially storing oxygen and carbon dioxide in the same volume of said gas-storage means, wherein storage of oxygen precedes storage of carbon dioxide, whereby the required volume of said gas storage means is minimized.

7. The method of claim 6, wherein said process of sequentially storing oxygen and carbon dioxide in the same volume comprises the steps of:

(a) providing an oxygen-induction system containing oxygen intended for said engine combustion and a carbon-capture system containing carbon dioxide produced in said engine combustion, (b) providing a set of gas-storage containers comprising one empty gas-storage container and a plurality of gas-storage containers filled with oxygen, wherein each gas-storage container, in said set of gas-storage containers, has an inlet valve and a gas-flow distributor, wherein each said inlet valve can selectively connect and disconnect the interior of said gas-storage container to and from said gas-flow distributor, and wherein said gas-flow distributor can be selectively connected to said oxygen-induction system and to said carbon-capture system, whereby said interior of said gas-storage container can be selectively connected to said oxygen-induction system and to said carbon-capture system, (c) connecting the interior of said empty gas-storage container to said carbon-capture system and connecting the interior of one gas-storage container filled with oxygen to said oxygen-induction system, (d) filling said empty gas-storage container with carbon dioxide and discharging oxygen from said one gas-storage container connected to said oxygen-induction system until said one gas-storage container becomes a new empty gas-storage container, (e) connecting the interior of said new empty gas-storage container to said carbon-capture system and connecting the interior of another one gas-storage container filled with oxygen to said oxygen-induction system, (f) filling said new empty gas-storage container with carbon dioxide and discharging oxygen from said another one gas-storage container connected to said oxygen-induction system until said another one gas-storage container becomes a new empty gas-storage container, and (g) continuing said process of sequentially storing oxygen and carbon dioxide until said set of gas-storage containers comprises a plurality of gas-storage containers filled with carbon dioxide, one empty gas-storage container, and no gas-storage containers filled with oxygen.

8. The method of claim 1 wherein the step of providing the source of fuel and the source of oxygen comprises the steps of:

(a) providing a carbon dioxide storage means for storing carbon dioxide discharged from said airless engine,
(b) providing a conversion means for converting carbon dioxide and water into hydrocarbon fuel and oxygen,
(c) providing a water source,
(d) providing a fuel storage,
(e) providing an oxygen storage,
(f) providing a supplemental carbon dioxide source,
(g) providing a supplemental oxygen source
(h) receiving carbon dioxide from said airless engine into said carbon dioxide storage means,
(i) receiving carbon dioxide from said carbon dioxide storage means into said conversion means,
(j) receiving water from said water source into said conversion means,
(k) converting said carbon dioxide and said water in said conversion means into hydrocarbon fuel and oxygen,
(l) receiving said hydrocarbon fuel from said conversion means into said fuel storage,
(m) receiving said oxygen from said conversion means into said oxygen storage, (n) receiving supplemental carbon dioxide from said supplemental carbon dioxide source into said carbon dioxide storage means, whereby said supplemental carbon dioxide compensates for gas lost to leakage, and
(o) receiving supplemental oxygen from said supplemental oxygen source into said oxygen storage, whereby said supplemental oxygen provides for the excess oxygen used in the combustion cycle, whereby said fuel storage serves as the source of fuel for said airless engine, whereby said oxygen storage serves as the source of oxygen for said airless engine, whereby said airless engine is powered by hydrocarbon fuel produced by using carbon dioxide generated in said airless engine combustion, whereby said airless engine fuel is repeatedly regenerated and reused, and whereby said airless engine operates in a carbon neutral mode of operation.

9. A method for operating and controlling an internal combustion engine system, said method comprising the steps of:

(a) providing an airless internal combustion engine that inducts no air from outside atmosphere and exhausts no gas to outside atmosphere, said engine including at least one cylinder, a cylinder chamber within said at least one cylinder and a piston that can reciprocate in said at least one cylinder varying volume of said cylinder chamber, said cylinder chamber containing diluent combustion gas that contains mostly carbon dioxide and water vapor, said airless engine repeatedly receiving fuel, oxygen and water into said cylinder chamber and repeatedly performing a combustion cycle that includes hot gas induction and water injection into said cylinder chamber, gas cooling, compression, combustion and expansion in said cylinder chamber and expulsion of combustion gas from said cylinder chamber into an exhaust manifold, wherein said combustion gas expelled from said cylinder chamber contains mostly carbon dioxide and water vapor, wherein said combustion gas expelled from said cylinder chamber is split into two fractions: a returned gas fraction and an excess gas fraction, wherein said returned gas fraction is inducted from said exhaust manifold back into said cylinder chamber and, wherein said excess gas fraction is expelled from said exhaust manifold, wherein specific heat of gas during combustion in said airless engine is substantially greater than specific heat of gas during combustion in an air-inducting engine, whereby a smaller mass of gas is required to absorb the heat of combustion in said at least one cylinder in said airless engine than the mass of gas required to absorb an equal amount of combustion heat in a cylinder of equal volume in an air-inducting engine with gas expansion equal to gas compression, said at least one cylinder including at least one exhaust valve and means for repeatedly performing openings and closings of said at least one exhaust valve, wherein timings of said openings and closings and cooling effect of water injection are such that that the gas contained in said at least one cylinder at the beginning of said gas effective compression occupies only a fraction of the full cylinder volume, and said gas compression takes up only a fraction of the piston stroke, while said gas expansion takes up the entire piston stroke, whereby said gas expansion is substantially greater than said gas compression, and whereby said airless engine operates in overexpanded cycle, wherein the volume of gas contained in said at least one cylinder in said airless engine at the beginning of said effective gas compression is smaller than the volume of gas contained in said cylinder of equal volume in said air-inducting engine at the beginning of gas compression, wherein the volume of gas contained in said at least one cylinder in said airless engine at the end of said gas expansion is equal to the volume of gas contained in said cylinder of equal volume in said air-inducting engine at the end of gas expansion, and wherein clearance volume in said at least one cylinder in said airless engine is substantially smaller than clearance volume in said cylinder of equal volume in said air-inducting engine, whereby said gas expansion in said airless engine is substantially greater than gas expansion in said air-inducting engine, whereby greater gas expansion contributes to improvement in said airless engine thermodynamic cycle efficiency, and whereby said improvement in said airless engine thermodynamic cycle efficiency is achieved without an increase in cylinder size, (b) providing a carbon-capture means for receiving and handling said excess gas fraction expelled from said exhaust manifold, said carbon-capture means comprising:
   (1) a water-condensation means for receiving said excess gas fraction from said exhaust manifold, condensing water vapor contained in said excess gas fraction and cooling the remaining gas,
   (2) a water-storage container,
   (3) a first compressor that has a constant displacement and operates with a variable speed that varies in direct proportion to changes in the speed of said engine,
   (4) a second compressor, and
   (5) a carbon-dioxide-storage container,
(c) providing a gas flow means for flowing gas between various parts of said system,
(d) providing a source of fuel and a source of oxygen,
(e) providing a fuel-delivery means and an oxygen-delivery means for delivering said fuel and said oxygen to said airless engine,
(f) providing a source of water and a water-delivery means for delivering water to said airless engine,
(g) providing a control means for controlling the operation of said internal combustion engine system in response to operator's demand and in accordance with a control program incorporated in said control means, said control means including a manual implement for generating and varying a control signal expressing said operator's demand,
(h) operating said airless engine by repeatedly performing said combustion cycle that includes the steps of:
   (1) inducting said return gas fraction from said exhaust manifold through said exhaust valve into said cylinder chamber during said piston first volume-increasing stroke, wherein the pressure of gas flowing into said cylinder chamber is equal to the pressure of gas in said exhaust manifold,
   (2) closing said exhaust valve when the volume of said cylinder chamber is close to its maximum,
   (3) receiving water into said cylinder chamber and cooling said returned gas fraction, whereby temperature and pressure in said cylinder chamber are reduced,
   (4) receiving fuel and oxygen into said cylinder chamber, whereby a combustion mixture is formed in said cylinder chamber,
   (5) compressing said combustion mixture in said cylinder chamber during the first part of said piston first volume-decreasing stroke, wherein the initial pressure in said cylinder chamber is restored,
   (6) further compressing said combustion mixture in said cylinder chamber during the second part of said piston first volume-decreasing stroke,
   (7) igniting said combustion mixture when the volume of said cylinder chamber is close to its minimum,
   (8) performing expansion and combustion of said combustion mixture during the first part of said piston second volume-increasing stroke, whereby said combustion mixture converts into combustion gas containing carbon dioxide and water vapor,
   (9) expanding said combustion gas during the second part of said piston second volume-increasing stroke,
   (10) opening said at least one exhaust valve when the volume of said cylinder chamber is close to its maximum again,
   (11) expelling said combustion gas from said cylinder chamber into said exhaust manifold during the second volume-decreasing stroke of said piston,
   (12) expelling said excess gas fraction from said exhaust manifold into said carbon capture-means, wherein the pressure of gas flowing into said carbon-capture means is equal to the pressure of gas in said exhaust manifold,
wherein the mass of gas flowing into said carbon-capture means is equal to the mass of said fuel, oxygen and water flowing into said airless engine,
wherein the mass of carbon dioxide contained in said excess gas fraction flowing into said carbon-capture means is proportional to the mass of fuel inducted into said engine,
(i) operating said carbon capture means by performing the steps of:
   (1) repeatedly receiving said excess gas fraction expelled from said exhaust manifold into said water-condensation means, condensing water vapor contained in said excess gas fraction, collecting water in said water-storage container and cooling the remaining gas to a pre-determined temperature, wherein the remaining gas is mostly carbon dioxide gas,
wherein pressure of excess gas received into said water condensation means remains equal to gas pressure in said exhaust manifold, and wherein the average mass of gas received into said water condensation means is equal to the average mass of said fuel, oxygen and water received into said airless engine,
   (2) receiving said carbon dioxide gas from said water condensation means into said first compressor, wherein the average mass of said carbon dioxide gas received into said first compressor is proportional to said average mass of fuel received into said airless engine,
wherein the gas pressure at the inlet to said first compressor is equal to the pressure of said excess gas fraction,
wherein the gas pressure at the inlet to said first compressor is equal to the gas pressure in said exhaust manifold, and wherein the mass of said returned gas flowing back into said cylinder chamber varies in direct proportion to changes in the mass of said fuel flowing into said airless engine,
whereby the gas-to-fuel ratio in said airless engine remains constant,
  (3) compressing said carbon dioxide gas in said first compressor and flowing compressed carbon dioxide gas into said second compressor,
  (4) receiving said compressed carbon dioxide gas from said first compressor into said second compressor,
  (5) further compressing said compressed carbon dioxide gas in said second compressor and, discharging further compressed carbon dioxide gas into said carbon-dioxide-storage container, and
  (6) cooling and storing said further compressed carbon dioxide gas in said carbon-dioxide-storage container, wherein carbon dioxide is stored as a liquid or as a supercritical fluid,
(j) controlling the operation of said internal combustion engine system by manually varying said control signal, wherein said control means responds to the change in said control signal by performing the steps of:
  (1) varying the mass of said fuel received into said cylinder chamber to satisfy said operator's demand for said airless engine speed and power,
  (2) varying the mass of said oxygen received into said cylinder chamber to satisfy the conditions for efficient combustion of said fuel in accordance with said control program incorporated in said control means,
  (3) varying the mass of said water received into said cylinder chamber to satisfy the conditions for proper gas temperature in said cylinder chamber in accordance with said control program incorporated in said control means,
  (4) varying other operating factors in said airless engine in accordance with said control program incorporated in said control means, said operating factors including ignition timing and injection timing,
whereby, thanks to reduced volume of gas contained in said at least one cylinder at the beginning of said effective compression and a proportional reduction in clearance volume in said at least one cylinder, an increase in expansion ratio is achieved, while the effective compression ratio remains unchanged,
whereby said increase in expansion ratio is accomplished without an increase in the volume of said at least one cylinder,
whereby said increase in expansion ratio leads to improvement in efficiency of said airless engine,
whereby said improvement in efficiency in said airless engine is achieved without a reduction in said engine power density,
whereby, thanks to flowing said carbon dioxide gas into a compressor that has a constant displacement and operates with a speed that is proportional to the speed of said airless engine, the mass of said gas returned to said cylinder chamber varies in direct proportion to changes in the mass of said fuel flowing into said airless engine,
whereby gas-to-fuel ratio in said airless engine remains constant regardless of changes in said engine load and there is no need for throttling,
whereby elimination of throttling leads to further improvement in said airless engine efficiency,
and whereby induction of hot gas brings back to said cylinder chamber some of the heat that escapes from said cylinder chamber in other engines, which adds to the heat of combustion,
whereby there is a net reduction in heat loss during the cycle and whereby the efficiency of said airless engine is further improved.

10. The method of claim 9 wherein the step of providing said carbon-capture means includes the step of providing a compressor-protection system including a pressure regulator installed before the inlet to said second compressor, and a short-term-storage reservoir installed before the inlet to said pressure regulator, wherein said pressure regulator prevents excessive pressure at the inlet to said second compressor and, wherein said short-term-storage reservoir temporarily absorbs excessive flow of gas, whereby said second compressor is protected against temporary excessive increase in inlet pressure.

11. The method of claim 9 wherein said control system includes a variable valve timing control, said control system using said variable valve timing control to change the timing of closure of said at least one exhaust valve, at heavy engine load, so that the volume of gas contained in said cylinder chamber at the beginning of said gas effective compression is substantially increased and greater amounts of said fuel and oxygen are injected into said cylinder chamber, wherein power of said airless engine is substantially increased, whereby the required peak power is achieved with smaller engine displacement, whereby friction loss is reduced and, whereby the efficiency of said airless engine is improved.

12. The method of claim 9 wherein said system includes an on-board gas-storage means, said gas-storage means performing a process of sequentially storing oxygen and carbon dioxide in the same volume of said gas-storage means, wherein storage of oxygen precedes storage of carbon dioxide, whereby the required volume of said gas storage means is minimized.

13. The method of claim 12, wherein said process of sequentially storing oxygen and carbon dioxide in the same volume comprises the steps of:
  (a) providing an oxygen-induction system containing oxygen intended for said engine combustion and a carbon-capture system containing carbon dioxide produced in said engine combustion,
  (b) providing a set of gas-storage containers comprising one empty gas-storage container and a plurality of gas-storage containers filled with oxygen, wherein each gas-storage container, in said set of gas-storage containers, has an inlet valve and a gas-flow distributor, wherein each said inlet valve can selectively connect and disconnect the interior of said gas-storage container to and from said gas-flow distributor, and wherein said gas-flow distributor can be selectively connected to said oxygen-induction system and to said carbon-capture system, whereby said interior of said gas-storage container can be selectively connected to said oxygen-induction system and to said carbon-capture system,
  (c) connecting the interior of said empty gas-storage container to said carbon-capture system and connecting the interior of one gas-storage container filled with oxygen to said oxygen-induction system,
  (d) filling said empty gas-storage container with carbon dioxide and discharging oxygen from said one gas-storage container connected to said oxygen-induction system until said one gas-storage container becomes a new empty gas-storage container, (e) connecting the interior of said new empty gas-storage container to said carbon-capture system and connecting the interior of another one gas-storage container filled with oxygen to said oxygen-induction system,
(f) filling said new empty gas-storage container with carbon dioxide and discharging oxygen from said another one gas-storage container connected to said oxygen-induction system until said another one gas-storage container becomes a new empty gas-storage container, and
(g) continuing said process of sequentially storing oxygen and carbon dioxide until said set of gas-storage containers comprises a plurality of gas-storage containers filled with carbon dioxide, one empty gas-storage container, and no gas-storage containers filled with oxygen.

14. The method of claim 9 wherein the step of providing the source of fuel and the source of oxygen comprises the steps of:
(a) providing a carbon dioxide storage means for storing carbon dioxide discharged from said airless engine,
(b) providing a conversion means for converting carbon dioxide and water into hydrocarbon fuel and oxygen,
(c) providing a water source,
(d) providing a fuel storage,
(e) providing an oxygen storage,
(f) providing a supplemental carbon dioxide source,
(g) providing a supplemental oxygen source
(h) receiving carbon dioxide from said airless engine into said carbon dioxide storage means,
(i) receiving carbon dioxide from said carbon dioxide storage means into said conversion means,
(j) receiving water from said water source into said conversion means,
(k) converting said carbon dioxide and said water in said conversion means into hydrocarbon fuel and oxygen,
(l) receiving said hydrocarbon fuel from said conversion means into said fuel storage,
(m) receiving said oxygen from said conversion means into said oxygen storage,
(n) receiving supplemental carbon dioxide from said supplemental carbon dioxide source into said carbon dioxide storage means, whereby said supplemental carbon dioxide compensates for gas lost to leakage, and
(o) receiving supplemental oxygen from said supplemental oxygen source into said oxygen storage, whereby said supplemental oxygen provides for the excess oxygen used in the combustion cycle,
whereby said fuel storage serves as the source of fuel for said airless engine,
whereby said oxygen storage serves as the source of oxygen for said airless engine,
whereby said airless engine is powered by hydrocarbon fuel produced by using carbon dioxide generated in said airless engine combustion,
whereby said airless engine fuel is repeatedly regenerated and reused, and
whereby said airless engine operates in a carbon neutral mode of operation.

15. A method for operating and controlling an internal combustion engine system, said method comprising the steps of:
(a) providing an airless internal combustion engine that inducts no air from outside atmosphere and exhausts no gas to outside atmosphere, said engine including at least one cylinder, a cylinder chamber within said at least one cylinder and a piston that can reciprocate in said at least one cylinder varying volume of said cylinder chamber, said cylinder chamber containing diluent combustion gas that contains mostly carbon dioxide and water vapor, said airless engine repeatedly receiving fuel, oxygen and water into said cylinder chamber and repeatedly performing a combustion cycle that includes hot gas retention in said cylinder chamber, water injection into said cylinder chamber, gas cooling, compression, combustion and expansion in said cylinder chamber and expulsion of excess gas fraction of said combustion gas from said cylinder chamber into an exhaust manifold, wherein said excess gas fraction is expelled from said exhaust manifold, wherein said excess gas fraction contains mostly carbon dioxide and water vapor,
wherein specific heat of gas during combustion in said airless engine is substantially greater than specific heat of gas during combustion in an air-inducting engine, whereby a smaller mass of gas is required to absorb the heat of combustion in said at least one cylinder in said airless engine than the mass of gas required to absorb an equal amount of combustion heat in a cylinder of equal volume in an air-inducting engine with gas expansion equal to gas compression,
said at least one cylinder including at least one exhaust valve and means for repeatedly performing openings and closings of said at least one exhaust valve, wherein timings of said openings and closings and cooling effect of water injection are such that the gas contained in said at least one cylinder at the beginning of said gas effective compression occupies only a fraction of the full cylinder volume, and said gas compression takes up only a fraction of the piston stroke, while said gas expansion takes up the entire piston stroke, whereby said gas expansion is substantially greater than said gas compression, and whereby said airless engine operates in overexpanded cycle,
wherein the volume of gas contained in said at least one cylinder in said airless engine at the beginning of said effective gas compression is smaller than the volume of gas contained in said cylinder of equal volume in said air-inducting engine at the beginning of gas compression,
wherein the volume of gas contained in said at least one cylinder in said airless engine at the end of said gas expansion is equal to the volume of gas contained in said cylinder of equal volume in said air-inducting engine at the end of gas expansion, and
wherein clearance volume in said at least one cylinder in said airless engine is substantially smaller than clearance volume in said cylinder of equal volume in said air-inducting engine, whereby said gas expansion in said airless engine is substantially greater than gas expansion in said air-inducting engine,
whereby greater gas expansion contributes to improvement in said airless engine thermodynamic cycle efficiency, and
whereby said improvement in said airless engine thermodynamic cycle efficiency is achieved without an increase in cylinder size,
(b) providing a carbon-capture means for receiving and handling said excess gas fraction expelled from said exhaust manifold, said carbon-capture means comprising:
(1) a water-condensation means for receiving said excess gas fraction from said exhaust manifold, condensing water vapor contained in said excess gas fraction and cooling the remaining gas, wherein the remaining gas is mostly cooled carbon dioxide,
(2) a water-storage container,
(3) a first compressor that has a constant displacement and operates with a variable speed that varies in direct proportion to changes in the speed of said engine,
(4) a second compressor, and
(5) a carbon-dioxide-storage container,
(c) providing a gas flow means for flowing gas between various parts of said system,
(d) providing a source of fuel and a source of oxygen,
(e) providing a fuel-delivery means and an oxygen-delivery means for delivering said fuel and said oxygen to said airless engine,
(f) providing a source of water and a water-delivery means for delivering water to said airless engine,
(g) providing a control means for controlling the operation of said internal combustion engine system in response to operator's demand and in accordance with a control program incorporated in said control means, said control means including a manual implement for generating and varying a control signal expressing said operator's demand,
(h) operating said airless engine by repeatedly performing said combustion cycle that includes the steps of:
  (1) closing said at least one exhaust valve at the end of the first part of said piston volume-decreasing stroke,
  (2) receiving water into said cylinder chamber and cooling said hot gas retained in said cylinder chamber, whereby temperature in said cylinder chamber is reduced,
  (3) receiving fuel and oxygen into said cylinder chamber, whereby a combustion mixture is formed in said cylinder chamber,
  (4) compressing said combustion mixture in said cylinder chamber during the second part of said piston volume-decreasing stroke,
  (5) igniting said combustion mixture when the volume of said cylinder chamber is close to its minimum,
  (6) performing expansion and combustion of said combustion mixture during the first part of said piston volume-increasing stroke, whereby said combustion mixture converts into combustion gas containing carbon dioxide and water vapor,
  (7) expanding said combustion gas during the second part of said piston volume-increasing stroke,
  (8) opening said at least one exhaust valve when the volume of said cylinder chamber is close to its maximum,
  (9) expelling excess fraction of said combustion gas from said cylinder chamber into said exhaust manifold during the first part of said piston volume-decreasing stroke,
  (10) expelling said excess gas fraction from said exhaust manifold into said carbon capture-means, wherein the pressure of gas flowing into said carbon-capture means is equal to the pressure of gas in said exhaust manifold,
whereby said combustion cycle is completed in two piston strokes and whereby said airless engine is a two-stroke engine,
wherein the mass of gas flowing into said carbon-capture means is equal to the mass of fuel, oxygen and water flowing into said airless engine,
wherein the mass of carbon dioxide contained in said excess gas fraction flowing into said carbon-capture means is proportional to the mass of fuel inducted into said engine,
(i) operating said carbon capture means by performing the steps of:
  (1) repeatedly receiving said excess gas fraction expelled from said exhaust manifold into said water condensation means, condensing water vapor contained in said excess gas fraction, collecting water in said water-storage container and cooling the remaining gas to a pre-determined temperature, wherein the remaining gas is mostly carbon dioxide gas,
wherein pressure of excess gas received into said water condensation means remains equal to gas pressure in said exhaust manifold, and wherein the average mass of gas received into said water condensation means is equal to the average mass of said fuel, oxygen and water received into said airless engine,
  (2) receiving said carbon dioxide gas from said water condensation means into said first compressor, wherein the average mass of said carbon dioxide gas received into said first compressor is proportional to said average mass of said fuel received into said airless engine,
wherein the gas pressure at the inlet to said first compressor is equal to the pressure of said excess gas fraction,
wherein the gas pressure at the inlet to said first compressor is equal to the gas pressure in said exhaust manifold, and
wherein the mass of said gas retained in said cylinder chamber varies in direct proportion to changes in the mass of said fuel flowing into said airless engine,
whereby the gas-to-fuel ratio in said airless engine remains constant,
  (3) compressing said carbon dioxide gas in said first compressor and flowing compressed carbon dioxide gas into said second compressor,
  (4) receiving said compressed carbon dioxide gas from said first compressor into said second compressor,
  (5) further compressing said compressed carbon dioxide gas in said second compressor and, discharging further compressed carbon dioxide gas into said carbon-dioxide-storage container, and
  (6) cooling and storing said further compressed carbon dioxide gas in said carbon-dioxide-storage container, wherein carbon dioxide is stored as a liquid or as a supercritical fluid,
(j) controlling the operation of said internal combustion engine system by manually varying said control signal, wherein said control means responds to the change in said control signal by performing the steps of:
  (1) varying the mass of said fuel received into said cylinder chamber to satisfy said operator's demand for said airless engine speed and power,
  (2) varying the mass of said oxygen received into said cylinder chamber to satisfy the conditions for efficient combustion of said fuel in accordance with said control program incorporated in said control means,
  (3) varying the mass of said water received into said cylinder chamber to satisfy the conditions for proper gas temperature in said cylinder chamber in accordance with said control program incorporated in said control means,
  (4) varying other operating factors in said airless engine in accordance with said control program incorporated in said control means, said operating factors including ignition timing and injection timing, whereby, thanks to reduced volume of gas contained in said at least one cylinder at the beginning of said compression and a proportional reduction in clearance volume in said at least one cylinder, an increase in expansion ratio is achieved, while the compression ratio remains unchanged, whereby said increase in expansion ratio is accomplished without an increase in the volume of said at least one cylinder, whereby said increase in expansion ratio leads to improvement in efficiency of said airless engine, whereby said improvement in efficiency in said airless engine is achieved without a reduction in said engine power density, whereby, thanks to flowing said carbon dioxide gas into a compressor that has a constant displacement and operates with a speed that is proportional to the speed of said airless engine, the mass of said gas retained in said cylinder chamber varies in direct proportion to changes in the mass of said fuel flowing into said airless engine, whereby gas-to-fuel ratio in said airless engine remains constant regardless of changes in said engine load and there is no need for throttling, whereby elimination of throttling leads to further improvement in said airless engine efficiency, whereby operating in two-stroke cycle reduces the friction loss, which leads to improved efficiency of said airless engine, and whereby retention of hot gas retains in said cylinder chamber some of the heat that escapes from said cylinder chamber in other engines, which adds to the heat of combustion, whereby there is a net reduction in heat loss during the cycle and whereby the efficiency of said airless engine is further improved.

16. The method of claim 15 wherein the step of providing said carbon-capture means includes the step of providing a compressor-protection system including a pressure regulator installed before the inlet to said second compressor, and a short-term-storage reservoir installed before the inlet to said pressure regulator, wherein said pressure regulator prevents excessive pressure at the inlet to said second compressor and, wherein said short-term-storage reservoir temporarily absorbs excessive flow of gas, whereby said second compressor is protected against temporary excessive increase in inlet pressure.

17. The method of claim 15 wherein said control system includes a variable valve timing control, said control system using said variable valve timing control to change the timing of closure of said at least one exhaust valve, at heavy engine load, so that the volume of gas contained in said cylinder chamber at the beginning of said gas compression is substantially increased and greater amounts of said fuel and oxygen are injected into said cylinder chamber, wherein power of said airless engine is substantially increased, whereby the required peak power is achieved with smaller engine displacement, whereby friction loss is reduced, and whereby the efficiency of said airless engine is improved.

18. The method of claim 15 wherein said system includes an on-board gas-storage means, said gas-storage means performing a process of sequentially storing oxygen and carbon dioxide in the same volume of said gas-storage means, wherein storage of oxygen precedes storage of carbon dioxide, whereby the required volume of said gas storage means is minimized.

19. The method of claim 18, wherein said process of sequentially storing oxygen and carbon dioxide in the same volume comprises the steps of:
(a) providing an oxygen-induction system containing oxygen intended for said engine combustion and a carbon-capture system containing carbon dioxide produced in said engine combustion,
(b) providing a set of gas-storage containers comprising one empty gas-storage container and a plurality of gas-storage containers filled with oxygen, wherein each gas-storage container, in said set of gas-storage containers, has an inlet valve and a gas-flow distributor, wherein each said inlet valve can selectively connect and disconnect the interior of said gas-storage container to and from said gas-flow distributor, and wherein said gas-flow distributor can be selectively connected to said oxygen-induction system and to said carbon-capture system, whereby said interior of said gas-storage container can be selectively connected to said oxygen-induction system and to said carbon-capture system,
(c) connecting the interior of said empty gas-storage container to said carbon-capture system and connecting the interior of one gas-storage container filled with oxygen to said oxygen-induction system,
(d) filling said empty gas-storage container with carbon dioxide and discharging oxygen from said one gas-storage container connected to said oxygen-induction system until said one gas-storage container becomes a new empty gas-storage container,
(e) connecting the interior of said new empty gas-storage container to said carbon-capture system and connecting the interior of another one gas-storage container filled with oxygen to said oxygen-induction system,
(f) filling said new empty gas-storage container with carbon dioxide and discharging oxygen from said another one gas-storage container connected to said oxygen-induction system until said another one gas-storage container becomes a new empty gas-storage container, and
(g) continuing said process of sequentially storing oxygen and carbon dioxide until said set of gas-storage containers comprises a plurality of gas-storage containers filled with carbon dioxide, one empty gas-storage container, and no gas-storage containers filled with oxygen.

20. The method of claim 15 wherein the step of providing the source of fuel and the source of oxygen comprises the steps of:
(a) providing a carbon dioxide storage means for storing carbon dioxide discharged from said airless engine,
(b) providing a conversion means for converting carbon dioxide and water into hydrocarbon fuel and oxygen,
(c) providing a water source,
(d) providing a fuel storage,
(e) providing an oxygen storage,
(f) providing a supplemental carbon dioxide source,
(g) providing a supplemental oxygen source
(h) receiving carbon dioxide from said airless engine into said carbon dioxide storage means,
(i) receiving carbon dioxide from said carbon dioxide storage means into said conversion means,
(j) receiving water from said water source into said conversion means,
(k) converting said carbon dioxide and said water in said conversion means into hydrocarbon fuel and oxygen,
(l) receiving said hydrocarbon fuel from said conversion means into said fuel storage, (m) receiving said oxygen from said conversion means into said oxygen storage,
(n) receiving supplemental carbon dioxide from said supplemental carbon dioxide source into said carbon dioxide storage means, whereby said supplemental carbon dioxide compensates for gas lost to leakage, and
(o) receiving supplemental oxygen from said supplemental oxygen source into said oxygen storage, whereby said supplemental oxygen provides for the excess oxygen used in the combustion cycle, whereby said fuel storage serves as the source of fuel for said airless engine, whereby said oxygen storage serves as the source of oxygen for said airless engine, and whereby said airless engine is powered by hydrocarbon fuel produced by using carbon dioxide generated in said airless engine combustion, whereby said airless engine fuel is repeatedly regenerated and reused, and whereby said airless engine operates in a carbon neutral mode of operation.

* * * * *